United States Patent [19]

Shinohara

[11] Patent Number: 5,050,979

[45] Date of Patent: Sep. 24, 1991

[54] EYEGLASS LENS

[75] Inventor: Toshihide Shinohara, Suwa, Japan

[73] Assignee: Seiko Epson Corporation, Tokyo, Japan

[21] Appl. No.: 443,428

[22] Filed: Nov. 29, 1989

[30] Foreign Application Priority Data

Nov. 29, 1988 [JP] Japan .............................. 63-301569
Feb. 17, 1989 [JP] Japan .............................. 1-37560
Mar. 10, 1989 [JP] Japan .............................. 1-58918

[51] Int. Cl.⁵ .......................... G02C 7/02; G02B 3/04
[52] U.S. Cl. ................................... 351/159; 359/708
[58] Field of Search .................. 351/159, 176, 167; 350/432-435

[56] References Cited

U.S. PATENT DOCUMENTS 4,289,387 9/1981 Jalie ............................... 351/159
4,561,736 12/1985 Furter et al. ..................... 351/159
4,613,217 9/1986 Fuerter et al. ............... 351/159 X Primary Examiner—Scott J. Sugarman
Attorney, Agent, or Firm—Blum Kaplan

[57] ABSTRACT

An improved eyeglass lens which includes a front and back surface, one of which is refractive surface. The lens is defined by a meridian on the refractive surface which substantially increases for at least 15 mm in the direction of the outer periphery of the lens from the optical axis. The change in curvature of the meridian may remain constant within the at least 5 mm from the optical axis. The curvature of the meridian is represented by $C(r)$ as a function of a distance $r$ from the optical axis, and the linear differential coefficient $dc/dr$ of the function $C$ may increase at least once and then decrease as the distance from the optical axis increases providing a thinner lens edge to improve lens appearance while maintaining superior optical efficiency.

9 Claims, 7 Drawing Sheets

EYEGLASS LENS

BACKGROUND OF THE INVENTION

The present invention relates to an eyeglass lens, and, in particular, to an improved shape of a refractive surface of an eyeglass lens.

Conventionally, a refractive surface (hereinafter the front refractive surface) on the front side of an eyeglass lens for use in correcting myopia.

This lens is spherically shaped to facilitate manufacturing and this lens is known as a spherical lens. Generally, a refractive power of a lens is expressed in diopter D, a surface refractive power at the surface of the lens is defined by a curvature $p$ of the surface expressed in $m^{-1}$ and a refractive index n of a lens material.

The surface refractive power may be expressed as:

$$(n-1) \times p$$

The surface refractive power of the lens front refractive surface is known as the base curve. A curvature corresponding to the base curve is the curvature of the base curve. The power of the lens is primarily determined by the refractive powers of both its front and back refractive surfaces. Therefore, the base curve can have various values according to the combination of these refractive powers. However, in order to reduce an astigmatism, one of the optical efficiencies of the lens, affecting an eye when a person looks at something through the lens periphery remote from the lens' optical axis, the base curve is practically limited within a certain range of values dependent on the power of the lens.

By way of example, reference is made to FIG. 2, illustrating the characteristic of a lens having a refractive index of 1.50 as one of the astigmatisms. The astigmatism generation state is shown at the rectangular co-ordinates of the graph in which the vertical axis is the refractive power of the base curve and the horizontal axis is the refractive power of the lens when a peripheral portion of the lens is looked through at an angle of 30° relative to the optical axis. The solid line designates the astigmatism generated when looking at a distant object and the figure accompanied with the line indicates the amount of the astigmatism. The solid lines for the astigmatism of 0.3 D are formed on opposite sides of the line indicating non-astigmatism (O D). The broken line similarly designates the astigmatism generated when looking at a close object (30 cm). FIG. 2 clearly shows that the most suitable base curves, having a zero astigmatism, are different for viewing distant objects and close objects. Therefore, base curves designed to fall within the hatched area are usually adopted so as to provide equally good viewing for both distant objects and close objects.

These lenses have been satisfactory for correcting myopia. However, they suffer from the disadvantage that the edge thickness of the lens, i.e. the thickness of the lens at its outer periphery, becomes thicker as the myopia becomes stronger. By way of example reference is made to FIG. 3 in which one example of such a lens, generally indicated as 10, is illustrated. Lens 10 has a power of 6 D and a diameter of 75 mm. Lens 10 is an ordinary plastic lens having a refractive index of 1.5, a base curve of 2.0 D and a center thickness of 2 mm. In this case, the thickness of edge 12 of the lens is 11.7 mm. Therefore, when being used for eyeglasses, it becomes unsightly due to its thick edge.

One known method for solving this problem is to reduce the base curve. Such a lens, generally indicated as 20, is shown in FIG. 4. The base curve of lens 20 is the same as lens 10, however the base curve is reduced to 1.0 D. The thickness of an edge 22 of lens 20 becomes 11.2 mm, which is 0.5 mm thinner than edge 12 of lens 10. However, since the base curve should be determined based upon the optical efficiency as described above, the optical efficiency severely degrades utilizing a base curve of 1.0.

As shown in the graphs of FIGS. 5 and 6, the astigmatism in the fields of vision utilizing lens 10 and lens 20, respectively, differ a great deal, but each degrades rapidly. The vertical axis of the rectangular co-ordinates represents an angle of the field of vision in degrees and the horizontal axis thereof represents an astigmatism in diopters based on a reference refractive power in a sagittal direction of the lens. FIGS. 5 and 6 show the astigmatism in each field of vision for viewing objects infinitely far away ($\infty$), 1 m away and 0.3 m away respectively.

Several methods are known for eliminating the unappealing external appearance of the myopia corrective lens. Such methods include making either the front refractive surface and/or the back refractive surface aspherical. One method combines two or more spherical surfaces. These methods have been satisfactory. However, these methods suffer from the problems below.

Making a front refractive surface aspherical is known from Japanese Laid Open Patent Publication No. 94947/78 and Japanese Patent Publication No. 41164/84 (U.S. Pat. No. 4,279,480). In the lens disclosed in Japanese Laid Open Patent Publication No. 94947/78 there is provided a front refractive surface comprising a central portion having a 40 mm diameter formed by one spherical surface and an outer peripheral portion formed by a torus surface having a larger curvature than that of the central portion's spherical surface. However, since there should not be an extremely large difference between curvature of the central portion and the curvature of the outer peripheral portion to prevent the optical efficiency of the outer peripheral portion from being degraded by the large spherical surface central portion, it becomes impossible to make the lens thinner. The lens disclosed in Japanese Patent Publication No. 41164/84 (U.S. Pat. No. 4,279,480) has a front refracting surface formed as an aspherical surface defined by a specific function. When viewed from the center of rotation to the periphery, a refracting surface of the lens first projects forward and then projects backward. The problem associated with this lens lies in its peculiar shape. Since the front refracting surface causes an extremely uneven reflection due to its undulation, the lens becomes unsightly.

A lens having its back refractive surface made aspherical, is known from Japanese Laid Open Patent Publication No. 84741, Japanese Laid Open Patent Publication No. 84742/78, Japanese Laid Open Patent Publication No. 195826/83 (IT 48315/82) and Japanese Laid Open Patent Publication No. 60724/85. These lenses suffer from the problems that their aspherical back refractive surfaces are not, aesthetically appealing when used in eyeglasses because their front refracting surfaces are made as a convex toric surface or a cylindrical surface in the case of an astigmatic lens. Further, since the eyeglass lens which is presently widely used has its back refractive surface formed as a concave toric surface utilizing a lens manufacturing machine adapted to manufacture that kind of lens, the manufacturing facility must be greatly modified when manufacturing the lens having the aspherical back refractive surface.

Accordingly, it is desired to provide a myopia corrective lens which overcomes the shortcomings of the prior art by providing a thinner lens having better overall optical efficiency.

SUMMARY OF THE INVENTION

Generally speaking, in accordance with the invention, an eyeglass lens having an outer periphery and an optical center has at least one refractive surface formed on the front or back surface of the lens. The front refractive surface may be formed by rotating the non-circular meridian about an axis of symmetry. A circular refractive surface is described by a radius of curvature about a center of rotation. The curvature of a meridian substantially increases for at least 15 mm in all directions of the outer periphery of the lens from the optical center.

Accordingly, it is an object of the invention to provide an improved myopia corrective eyeglass lens.

Another object of the invention is to provide an eyeglass lens having superior optical efficiency while maintaining a thin shape.

Yet another object of the invention is to provide an eyeglass providing increased optical efficiency while maintaining a pleasing aesthetic appearance for use with eyeglasses.

Still other objects and advantage of the invention will in part be obvious and will in part be apparent from the specification.

The invention accordingly comprises an article of manufacture possessing the feature, properties and the relation of elements which will be exemplified in the article hereinafter described and the scope of the invention will be indicated in the claims.

BRIEF DESCRIPTION OF THE DRAWINGS

For a fuller understanding of the invention, reference is had to the following description taken in connection with the accompanying drawings, in which.

DETAILED DESCRIPTION OF THE PREFERRED EMBODIMENTS

Figure 1:
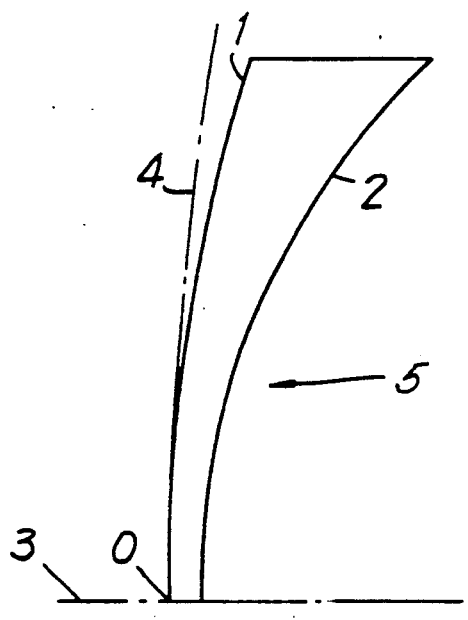
FIG. 1 is a partial sectional view of an eyeglass lens constructed in accordance with the invention.
Figure 2:
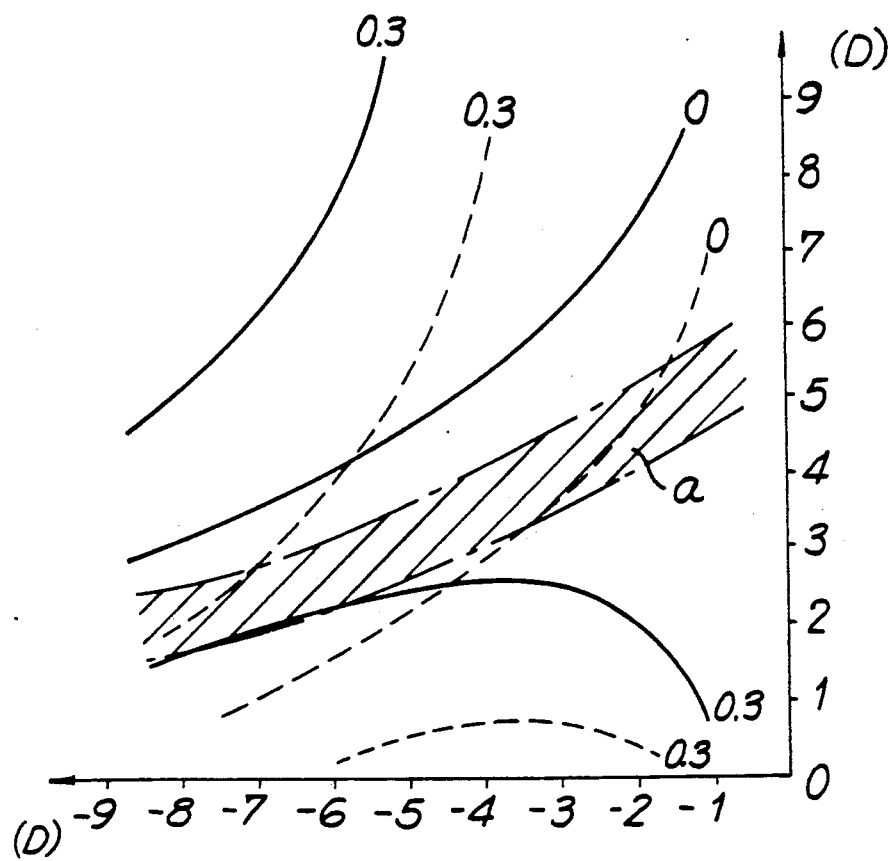
FIG. 2 is a graphical representation of the astigmatism generated by different power combinations for a variety of base curves of conventional spherical lenses.
Figure 3:
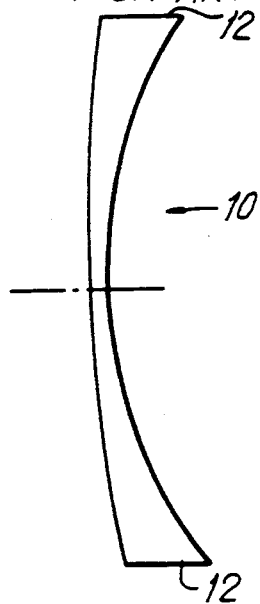
FIG. 3 is a graphical representation of a conventional spherical lens having a power of −6 and a base curve of 2.0 D.
Figure 5:
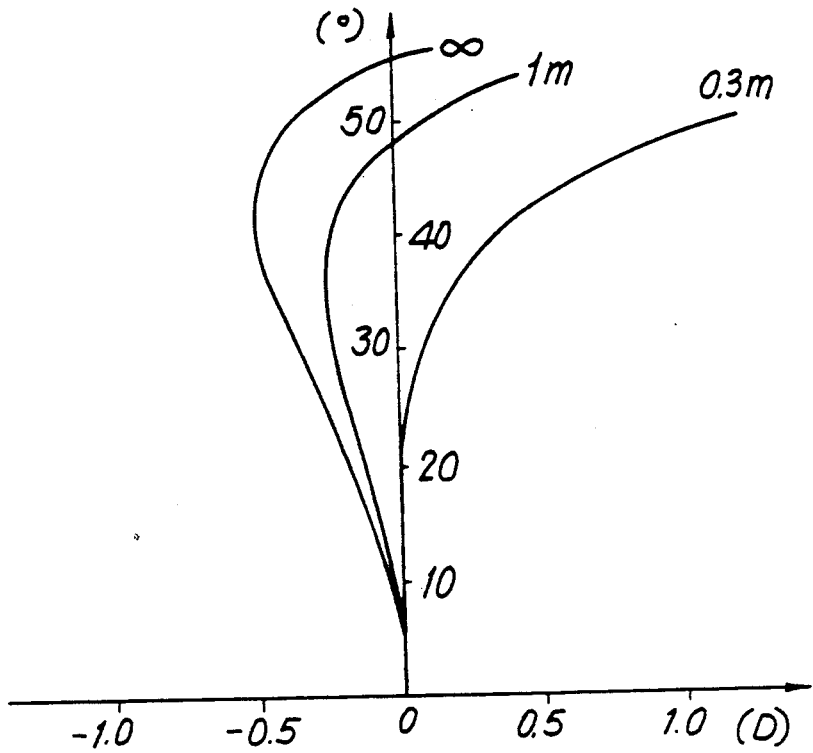
FIG. 5 is a graphical representation of an astigmatism with respect to the angles of field vision for the conventional spherical lens of FIG. 3.
Figure 4:
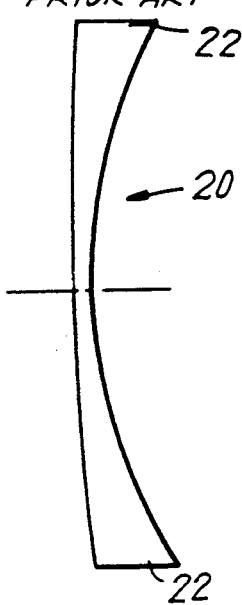
FIG. 4 is a graphical representation of a conventional spherical lens having a power of −6 D and a base curve of 1.0 D.

Reference is first made to FIG. 1 in which an eyeglass lens generally indicated as 5 constructed in accordance with the invention is provided. Lens 5 includes a front refractive surface 1 defined by a meridian and a back refractive surface 2. An axis of symmetry for the lens of which only one portion is shown is indicated by a dashed line 3. Front refractive surface 1 is formed by rotating a non-circular meridian about the axis of symmetry 3. A circular front refractive surface 4 is defined by a radius of curvature, the inverse number of the curvature, about a center of rotation 0. Circular refractive surface 4 is provided in phantom to indicate the circular front refractive surface of the conventional eyeglass lens. Each of the embodiments defined below have the general shape of lens 5 and differ only in the parameters graphically illustrated in FIGS. 7-17.

Figure 7:
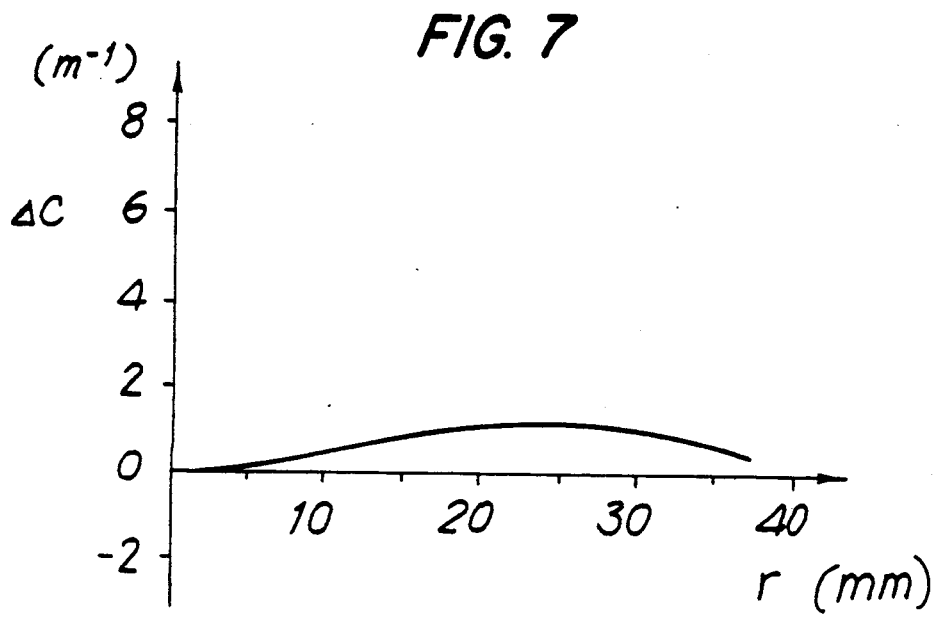
FIG. 7 is a graphical representation of the change of curvature of the meridian of an eyeglass lens constructed in accordance with the invention.
Figure 8:
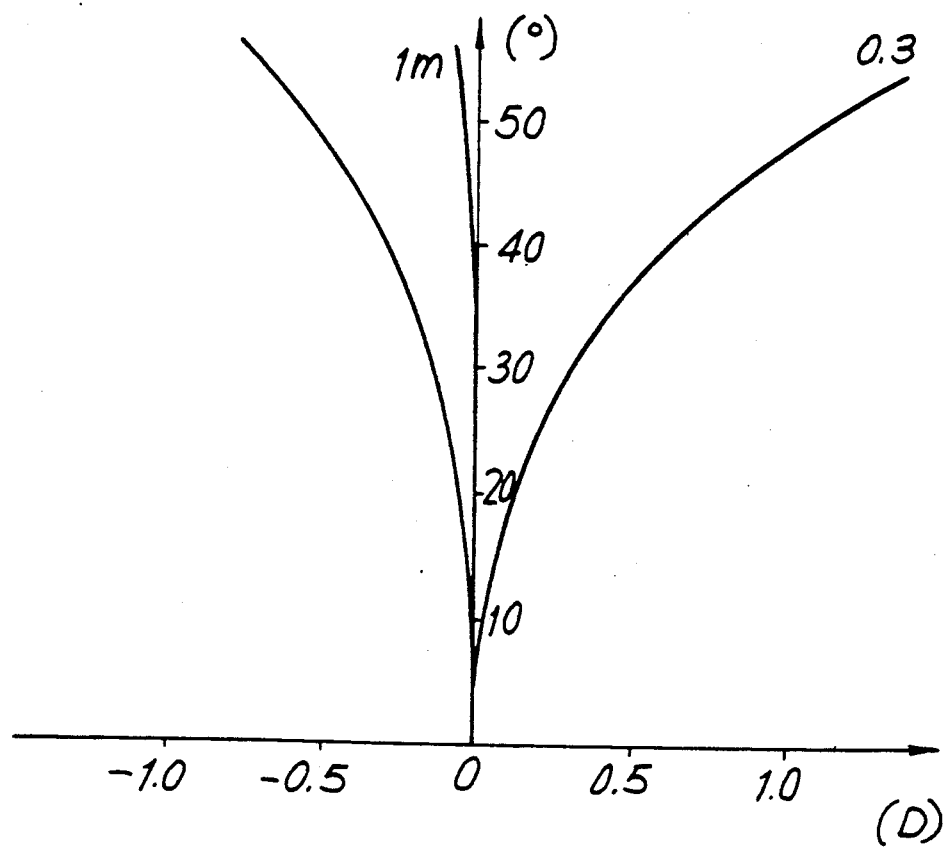
FIG. 8 is a graph representing the amount of astigmatism with respect to an angle of a field of vision of an eyeglass lens according to FIG. 7.

A first embodiment of lens 5 is illustrated in FIGS. 7 and 8. In this embodiment, lens 5 is attained by applying the present invention to the above-mentioned conventional lenses 10,20 having a power of −6 D and a base curve of 1.0 D.

FIG. 7 shows the change of curvature at a meridian of a front refractive surface 1 of eyeglass lens 5. In FIG. 7, the horizontal axis indicates the distance from the axis of symmetry 3 in the direction of the lens periphery and the vertical axis indicates a change in the curvature with respect to the curvature of the base curve. Discrete changes ΔC of the curvature are shown in Table 1. As shown in FIG. 7, as the distance from the axis of symmetry becomes greater, the curvature at the meridian gradually increases with the rate of increase growing as far as 10 mm away from the axis of symmetry 3. The rate of increase in curvature change decreases between 10 mm and 15 mm, and the increase of the curvature becomes zero between 20 mm and 25 mm. The change in curvature decreases beyond 25 mm. When representing the curvature mathematically by means of the function C(r) relative to the distance r from the axis of symmetry, its linear differential coefficient dC/dr increases gradually from zero at the axis of symmetry, reaches a peak between 10 mm and 15 mm along the lens radius and then decreases as it extends even farther.

As shown in FIG. 1, by changing the curvature so that the front refractive surface is shaped so as to shift towards the back refractive surface, the farther the point is from the axis of symmetry along a circular arc of the base curve. Therefore, it becomes possible to make the edge thickness of the lens thinner. In this embodiment, the edge thickness becomes 10.8 mm, which is 0.4 mm thinner than the spherical lens which had an edge thickness of 11.2 mm. Accordingly, the edge can be made thinner by 0.9 mm compared with the spherical lens having the ordinary base curve 2.0 D.

Figure 6:
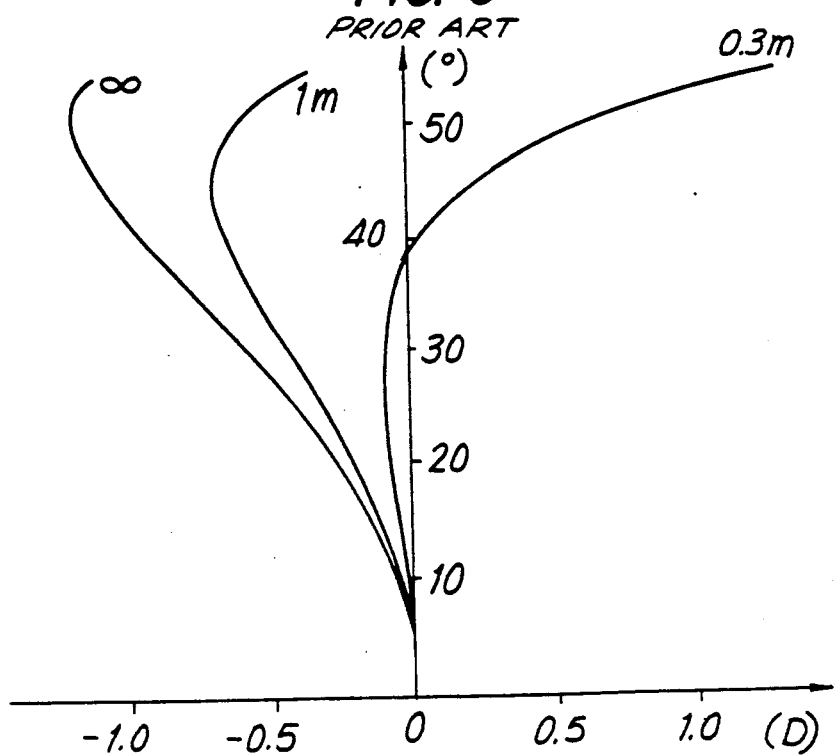
FIG. 6 is a graphical representation of an astigmatism with respect to the angles of field vision for the conventional spherical lens of FIG. 4.

Reference is now made to FIG. 8 in which the astigmatism of lens 5 constructed in accordance with this embodiment is provided. When comparing this lens 5 with the conventional lens in which astigmatism is increased by lowering the base curve, as shown in FIG. 6, it can be seen that the astigmatism is remarkably improved by making the lens aspherical even utilizing the same base curve.

TABLE 1

| r (mm) | ΔC (m$^{-1}$) |
|---|---|
| 0.0 | 0.00 |
| 2.5 | 0.04 |
| 5.0 | 0.17 |
| 7.5 | 0.36 |
| 10.0 | 0.58 |
| 12.5 | 0.78 |
| 15.0 | 0.98 |
| 17.5 | 1.12 |
| 20.0 | 1.20 |
| 22.5 | 1.24 |
| 25.0 | 1.22 |
| 27.5 | 1.15 |
| 30.0 | 1.04 |
| 32.5 | 0.89 |
| 35.0 | 0.69 |
| 37.5 | 0.47 |

Figure 9:
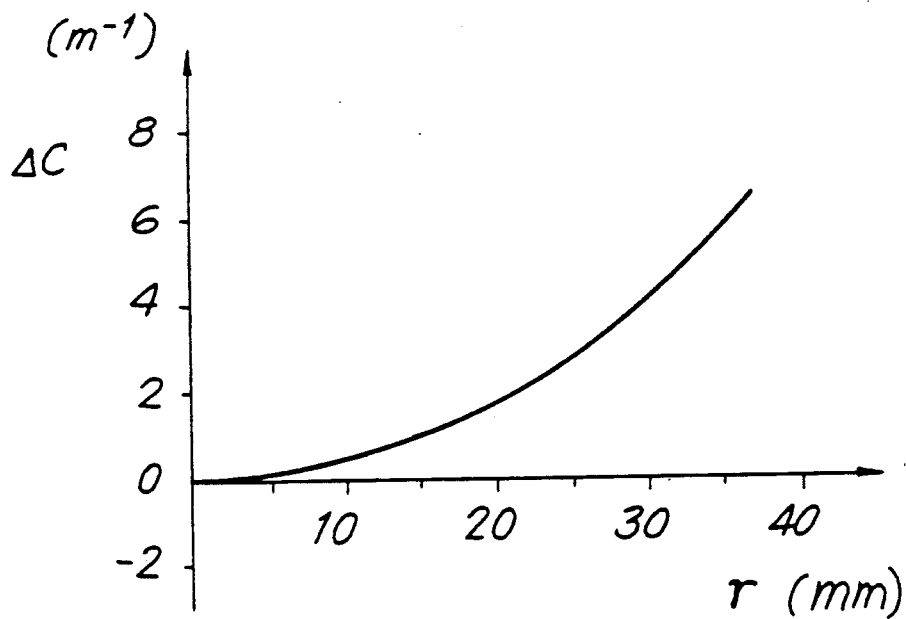
FIG. 9 is a graph showing a change in curvature of the meridian of an eyeglass constructed in accordance with a second embodiment of invention.
Figure 10:
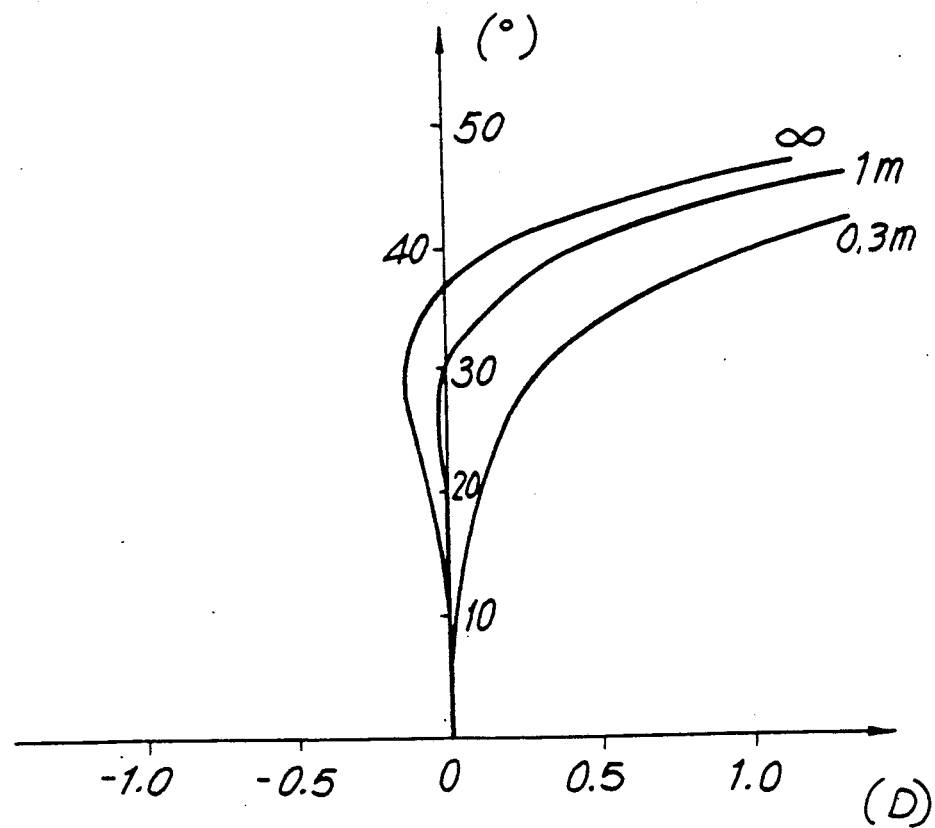
FIG. 10 is a graph showing the amount of astigmatism with respect to an angle of the field of vision of an eyeglass lens according to FIG. 9.

Reference is now made to FIGS. 9 and 10 in which a second embodiment of the present invention, which is attained by applying the present invention to a lens 5 having the power of −6 D and the base curve of 1.0 D, is illustrated. FIG. 9 shows a change of curvature of a front refractive surface 1. Concrete change amounts of the curvature are shown in Table 2 below. Comparing the first embodiment of Table 1 with the second embodiment, the two are identical for the first 15 mm from the axis of symmetry. However, as seen in Table 2, the curvature abruptly increases beyond 15 mm to the outer periphery. As a result, since the meridian shifts farther towards the back refracting surface of the lens in the outer periphery of the lens than in the first embodiment, the edge thickness becomes even thinner than in the first embodiment. In this embodiment, the edge thickness becomes 10.5 mm, which is 0.3 mm thinner than the edge of the first embodiment.

Reference is now made to FIG. 10 in which the astigmatism for this embodiment is shown. As can be seen, the astigmatism is the same as the first embodiment for values up to a field of vision of 30° corresponding to a 15 mm distance on the lens. The astigmatism abruptly increases beyond this point. This embodiment is designed to improve the optical efficiency with such a limited range as superior optical efficiency is required because of the high frequency of use of this viewing range during the ordinary use of eyeglasses. This embodiment provides, by utilizing a gradually increasing curvature change, the same lens shape as the first embodiment within 15 mm of the axis of symmetry on the lens as well as making the edge thickness thinner by more abruptly increasing the curvature at the periphery.

TABLE 1

| r (mm) | ΔC (m$^{-1}$) |
|---|---|
| 0.0 | 0.00 |
| 2.5 | 0.04 |
| 5.0 | 0.17 |
| 7.5 | 0.36 |
| 10.0 | 0.58 |
| 12.5 | 0.78 |
| 15.0 | 0.98 |
| 17.5 | 1.30 |
| 20.0 | 1.61 |
| 22.5 | 1.99 |
| 25.0 | 2.50 |
| 27.5 | 3.08 |
| 30.0 | 3.83 |
| 32.5 | 4.62 |
| 35.0 | 5.50 |
| 37.5 | 6.54 |

Figure 11:
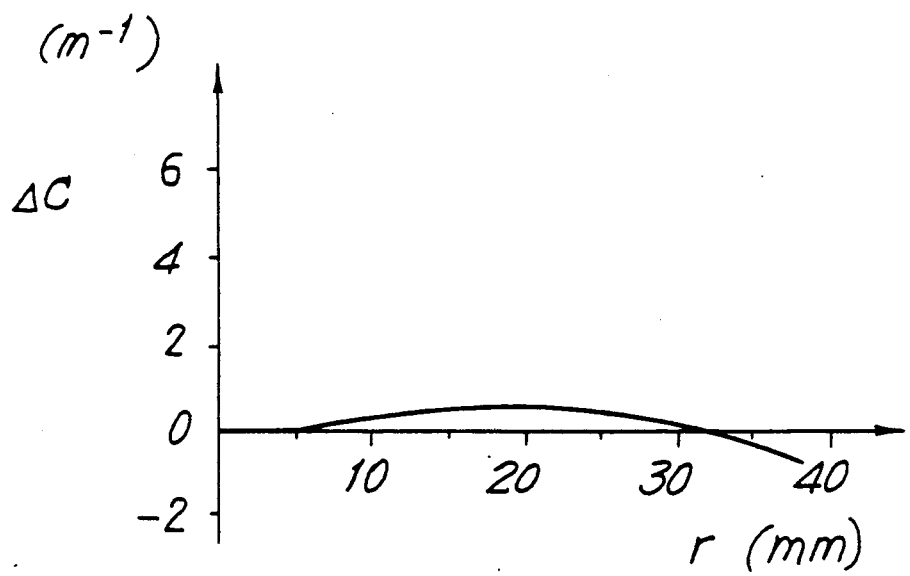
FIG. 11 is a graph showing a change in curvature of a meridian of an eyeglass lens constructed in accordance with a third embodiment of the invention.
Figure 12:
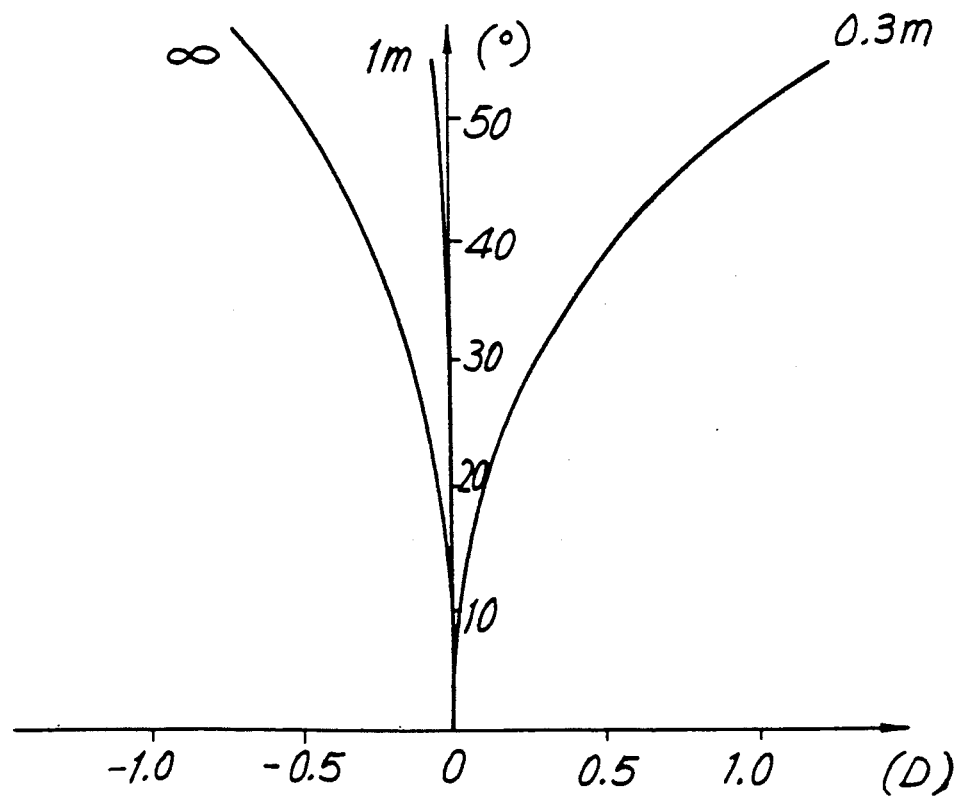
FIG. 12 is a graph showing the amount of astigmatism with respect to an angle of the field of vision of the eyeglass lens according to FIG. 11.

Reference is now made to FIG. 11 and 12 in which a third embodiment of lens 5 of the present invention is provided. Lens 5 is again constructed to have a power of −6 D and a base curve of 2.0 D.

TABLE 3

| r (mm) | ΔC (m$^{-1}$) |
|---|---|
| 0.0 | 0.00 |
| 2.5 | 0.02 |
| 5.0 | 0.10 |
| 7.5 | 0.21 |
| 10.0 | 0.35 |
| 12.5 | 0.46 |
| 15.0 | 0.54 |
| 17.5 | 0.58 |
| 20.0 | 0.59 |
| 22.5 | 0.52 |
| 25.0 | 0.40 |
| 27.5 | 0.26 |
| 30.0 | 0.05 |
| 32.5 | −0.17 |
| 35.0 | −0.40 |
| 37.5 | −0.67 |

In this embodiment, as seen in FIG. 11 and Table 3, the curvature first increases and then decreases so as to become smaller than the curvature of the base curve at a portion of the lens adjacent to the periphery of the lens such as 30 mm from the axis of symmetry. Though the edge thickness becomes 11.5 mm which is thinner by only 0.2 mm than that of the spherical lens, the optical efficiency is improved as evidenced by the lessened astigmatism shown in FIG. 12.

Figure 13:
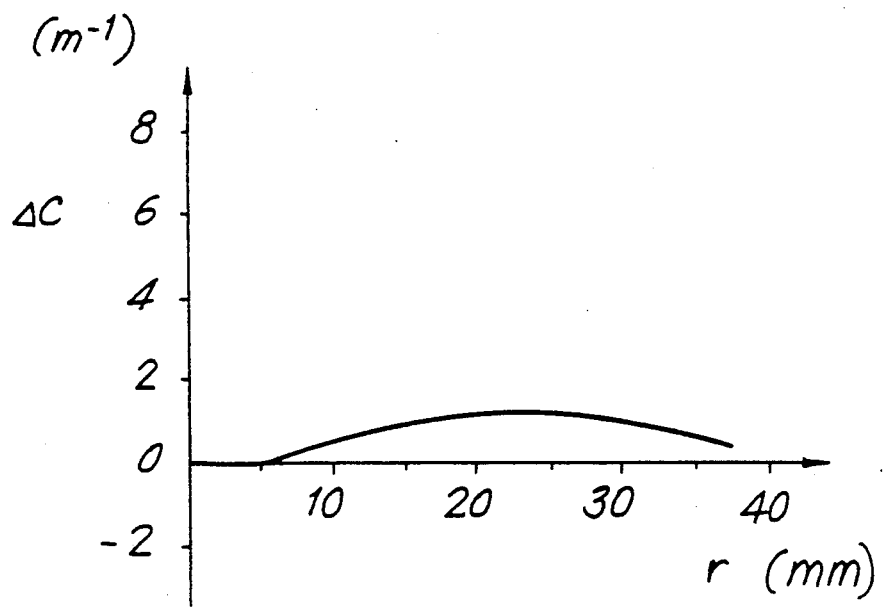
FIG. 13 is a graph showing a change of curvature of a meridian of an eyeglass lens constructed in accordance with a fourth embodiment of the invention.
Figure 14:
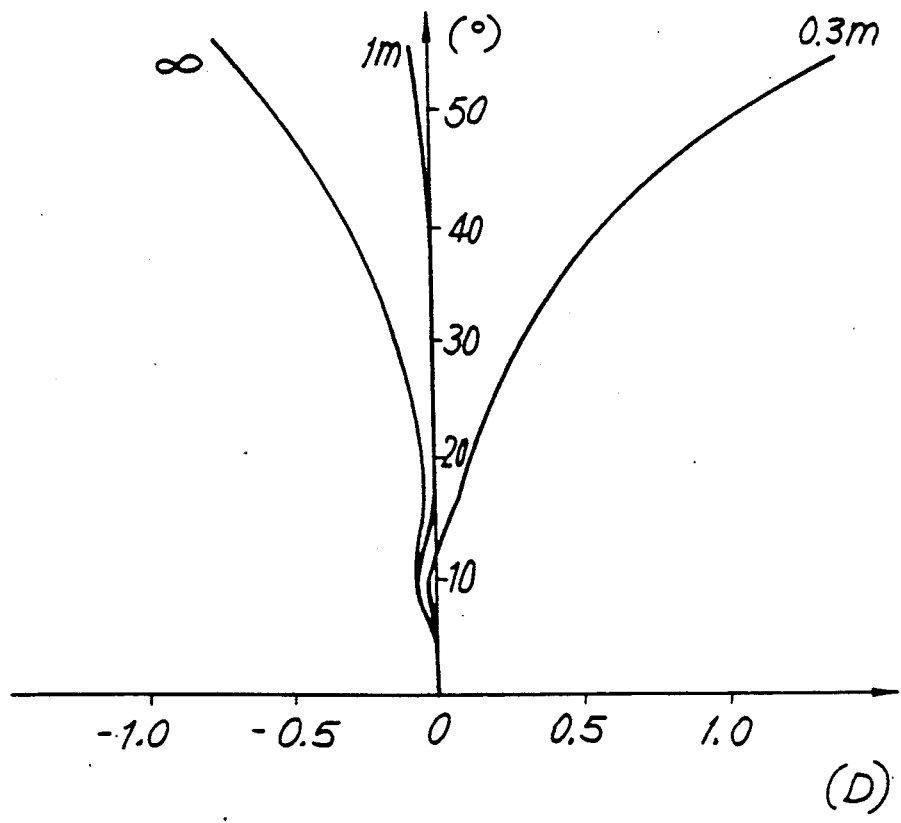
FIG. 14 is a graph showing the amount of astigmatism with respect to an angle of the field of vision of an eyeglass lens according to FIG. 13.

Reference is now made to FIGS. 13 and 14 in which a fourth embodiment of the present invention is illustrated. The fourth embodiment of lens 5 includes a spherical portion having a 5 mm radius at the central portion as in the above first embodiment. As seen in FIG. 13 and Table 4 below, the change in curvature is constant without any changes for the first 5 mm extending from the axis of symmetry. The change in curvature then first increases and then decreases along a line extending towards the periphery similar to the first embodiment.

As a result, even though the astigmatism increases in the central spherical portion due to the decrease of the base curve as shown in FIG. 14, it is improved outside the central portion by making the outer periphery aspherical similar to the outer portion of the first embodiment. The increase of the astigmatism in the central portion does not interfere with the wearer's sight during use of the lens because by adjusting the base curve and the size of the central spherical portion the increase of the astigmatism falls within the range of 0.1 D~0.15 D. Thereupon, even though the edge thickness is reduced only slightly in comparison with the first embodiment, the edge thickness is advantageously decreased to become 10.9 mm in comparison with the much thicker conventional edge.

The lens according to this embodiment has many benefits not provided in the embodiments of FIGS. 9–12. First, stable measurement results can be obtained when measuring the lens power That is, since the lenses of the above embodiments are aspherical throughout their surfaces without being almost spherical at the central portions, the measurement of lens power with a lens meter at the optical axis (usually coincident with the axis of symmetry) is greatly affected by only a slight deviation of the measuring position producing erroneous results such as a shifting of the power and an accompanying astigmatism due to the affect of the asphericity. But those problems can be solved by the provision of a spherical portion at the lens center.

When comparing the embodiment of FIG. 14 with that of FIG. 8, they seem to be inverted. However, since both FIGS. 8 and 14 show the astigmatisms extending from the center of the lens to the outer periphery of the lens when worn and the light passing angles differ during lens meter measurement of the power, they present the inverted results respectively.

TABLE 4

| r (mm) | $\Delta C$ (m$^{-1}$) |
|---|---|
| 0.0 | 0.00 |
| 2.5 | 0.00 |
| 5.0 | 0.00 |
| 7.5 | 0.36 |
| 10.0 | 0.58 |
| 12.5 | 0.78 |
| 15.0 | 0.98 |
| 17.5 | 1.12 |
| 20.0 | 1.20 |
| 22.5 | 1.24 |
| 25.0 | 1.22 |
| 27.5 | 1.15 |
| 30.0 | 1.04 |
| 32.5 | 0.89 |
| 35.0 | 0.69 |
| 37.5 | 0.47 |

Further, this embodiment makes it possible to provide a lens having an eccentricity similar to the conventional lens in which the front refractive surface is spherical. Since stable power results can be obtained in the central spherical portion in comparison with the lens having the aspherical refractive surface throughout, a specified power can be readily attained which is different from the entirely aspherical lens even though an eccentric grinding is carried out within the spherical range to form the lens.

To obtain the above benefits, it is necessary to provide a central spherical portion having a radius of at least 3 mm. In a preferred embodiment the radius is not less than 5 mm, because the aperture of the measuring portion of the ordinary lens meter is 5 mm~10 mm.

Figure 15:
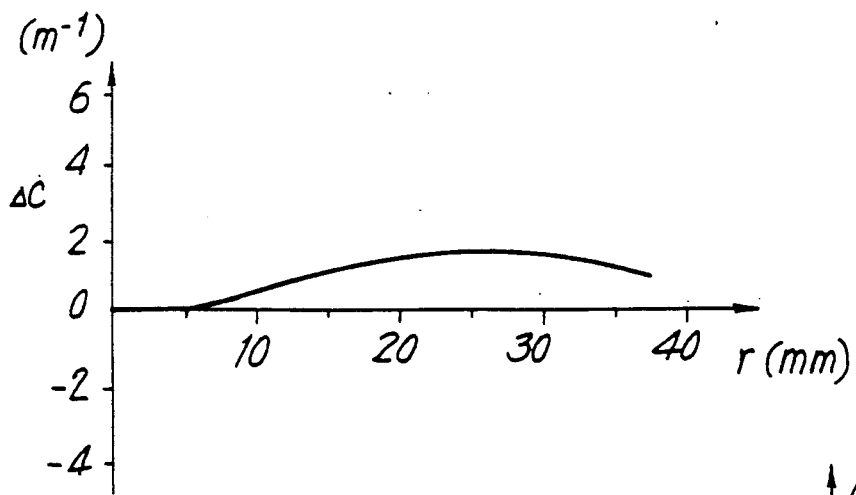
FIG. 15 is a graph showing a change of curvature of a meridian of an eyeglass lens constructed in accordance with a fifth embodiment of the invention.
Figure 16:
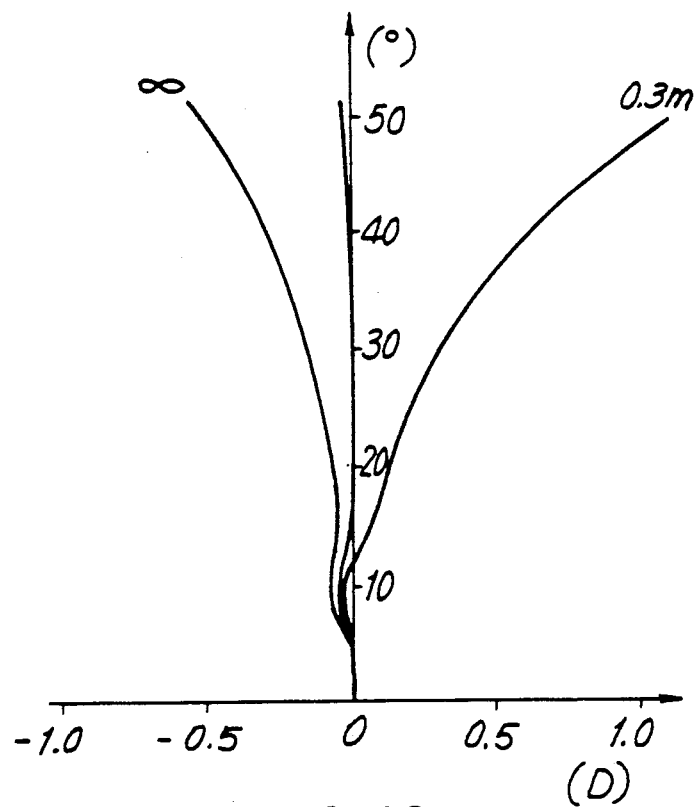
FIG. 16 is a graph showing an amount of astigmatism with respect to an angle of the field of vision of an eyeglass lens according to FIG. 15.

Reference is now made to FIGS. 15 and 16 in which a fifth embodiment of a lens 5 constructed in accordance with the present invention is illustrated. This embodiment of lens 5 has the same power of −6 D, the same diameter and the same central thickness as those in the first four embodiments. However, the fifth embodiment of lens 5 is made of a material having a refractive index of 1.60 and an Abbe's number of 35, while its base curve is 1.0 D.

FIG. 15 illustrates a change of curvature at the meridian of the front refractive surface of the lens. The horizontal axis indicates a distance from the axis of symmetry and the vertical axis indicates a change in the amount of curvature with respect to the curvature of the base curve. Discrete change amounts $\Delta C$ of the curvature are shown in Table 5 below. The lens according to this embodiment has a central spherical portion similar to the third embodiment. As shown in FIG. 15, as the distance from the axis of symmetry increases the curvature of the meridian is constant to a distance of 5 mm from the axis of rotation and then gradually increases with an accelerated increase in change between 5 mm and 10 mm. The rate of change then decreases between 10 mm and 15 mm. The increase of the curvature becomes zero at about a distance of 25 mm and change in the curvature begins to decrease.

When representing the curvature mathematically by the function C(r) relative to the distance r from the axis of symmetry, its linear differential coefficient dC/dr is zero from the axis of symmetry to 5 mm from the axis of symmetry, then increases gradually from there, reaches a peak between 10 mm and 15 mm and then decreases as r becomes larger. In this embodiment, the edge thickness of the lens is 9.0 mm, which is thinner by 2.7 mm (23%) or by 2.2 mm (20%) respectively with respect to the edge thickness of 11.7 mm or 11.2 mm of the conventional spherical lens having a refractive index of 1.50. Further, the result obtained by enhancing the refractive index of the lens material, compared to the fourth embodiment having the similar change of curvature, advantageously reduces the edge thickness from 10.9 mm to 9.0 mm; by 1.9 mm (17.4%).

On the other hand, FIG. 16 shows the astigmatism of the lens according to this embodiment. In opposition to the conventional spherical design having its astigmatism remarkably increased by lowering its base curves as shown in FIG. 6, the astigmatism of the lens according to this embodiment is remarkably improved by the aspherical design having the change of curvature as mentioned even utilizing the similar base curve.

TABLE 5

| r (mm) | $\Delta C$ (m$^{-1}$) |
|---|---|
| 0.0 | 0.00 |
| 2.5 | 0.00 |
| 5.0 | 0.00 |
| 7.5 | 0.25 |
| 10.0 | 0.52 |
| 12.5 | 0.82 |
| 15.0 | 1.06 |
| 17.5 | 1.26 |
| 20.0 | 1.41 |
| 22.5 | 1.51 |
| 25.0 | 1.55 |
| 27.5 | 1.54 |
| 30.0 | 1.47 |
| 32.5 | 1.39 |
| 35.0 | 1.20 |
| 37.5 | 0.99 |

It is determined that the lenses of the above-mentioned embodiments are designed to reduce the astigmatism nearly to zero when looking at an object at the distance of 1 m, an intermediate distance, and that design is accomplished. However, the second embodiment accomplishes the improvement of the astigmatism only within the limited range of a 30° angle of the field of vision. Additionally, it also becomes possible to design an eyeglass lens so as to make the astigmatism approach zero when looking at a distant object in lenses designed for viewing a distant sight as well as design it so as to make the astigmatism approach zero when looking at a near object such as at a distance of about 30 cm in a lens designed for viewing a near sight. In either case, the basic change of curvature is the same as that of this embodiment, but the curvature change amount of the lens suited to the distant sight becomes larger than that of this embodiment, and the curvature change amount of the lens suited to the near sight becomes smaller than that of this embodiment. Thereupon, the edge thickness of the lens suited to the distant sight becomes thinner than this embodiment, and edge thickness of the lens suited to the near sight becomes thicker than that of this embodiment, but still thinner than that of the spherical lens.

According, to a study by the inventor of the present invention, at about the distance at which the improvement of the astigmatism is intended, it is understood that the peripheral portion of the lens falls short of a full corrective power when the lens is suited for the distant sight, has a corrective power nearly similar to that necessary or slightly insufficient with respect to the power at the central portion when it is suited to the intermediate viewing and has a slightly excessive corrective power when the lens is constructed for close viewing. Therefore, the design distance may be decided so as to allow balancing of the above-mentioned edge thinning in accordance with the intended use of the lens. It is preferable for usual use to suit the eyeglass lenses to the intermediate sight at the distance of about 1 m.

Some of the many features and advantages of the present invention should now be apparent. In a myopia correcting eyeglass lens according to the present invention, the thinning of an edge thickness thereof and the improvement of an optical efficiency can be accomplished simultaneously. The lens is especially effective for both the thinning of the edge thickness of the lens and the improvement of the optical efficiency thereof to gradually increase the curvature of the meridian as far as 15 mm from the axis of symmetry. Further, the lens optical efficiency effectively improved by first increasing the linear differential coefficient of the function of the curvature C(r) and then decreasing it. Further more, by combining the above-mentioned change of curvature of the curvature of the base curve, the curve value near the axis with symmetry in the present invention, which can not be used due to optical efficiency as the ordinary spherical lens, for example such a low base curve as to meet the following condition, eyeglass lenses can be attained having a superior optical efficiency and a remarkably thinned edge thickness. For example, in relation to an equivalent spherical power S of the lens, the lens is constructed so that:

a) in case that $-6 < S < -2$ $(n-1) \times \rho_0 < 0.5 \times (S+6) + 1.5$ b) in case that $S < -6$ $(n-1) \times \rho_0 1.5$ where n is a refractive index of a lens material, and $\rho_0$ is a curvature near the axis of symmetry, namely a curvature of the base curve.

Additionally, as discussed in the embodiments of the present invention, in the case of combining a high refractive index with lenses with a lens material having a refractive index more than 1.55 compared with an ordinary refractive index of 1.50 in a plastic eyeglass lens, the lens can be made remarkably thin.

Generally, in a lens material having a high refractive index, the Abbe's number is small, for example, in plastic materials the Abbe's number becomes not more than 40 in the case of a refractive index not less that 1.55, and disadvantageously a chromatic aberration is generated in which a spectrum is observed along a contour of an object. This results from a prism effect when looking at an object through the peripheral portion of the lens. However, by applying an aspherical design according to the present invention to the lens, it becomes possible to improve such a chromatic aberration because a wedged portion formed by the front and back refractive surfaces at the peripheral portion of the lens is reduced in comparison with the conventional spherical lens, namely the prism effect is reduced as shown in FIG. 1.

By providing a zero change of curvature which extends as far as 5 mm from the axis of rotation, namely providing a 10 mm spherical portion in the central portion of the lens, the power of the lens can be stably measured without being affected by asphericity even though the optical axis deviates 1~2 mm (such a deviation might be caused during the grinding) at the time of power measurement by a lens meter at the optical axis, usually coincident with the axis of rotation. Accordingly, it is possible to intentionally deviate the optical axis to meet such a special request as to provide an eccentricity if it is within 2~3 mm.

Further according to the present invention, the above lenses overcome the problems related to external appearances and manufacturing which are associated with the conventional myopia corrective aspherical lens while providing an eyeglass lens for which has both a sufficiently thinned edge thickness and a superior optical efficiency.

Figure 17:
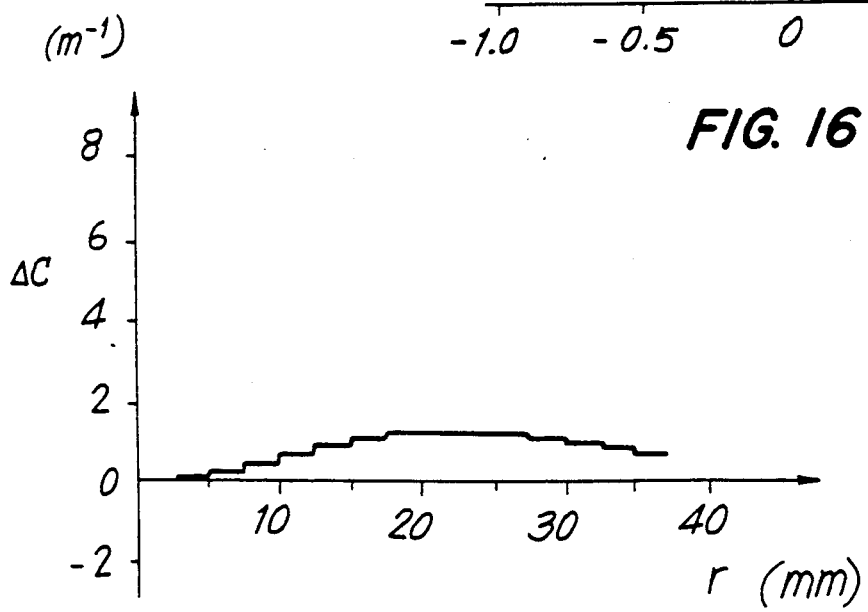
FIG. 17 is a graph showing a change of curvature of a meridian of an eyeglass lens constructed in accordance with a sixth embodiment of the invention.

Additionally, a lens in which curvature is changed by minute steps as shown in FIG. 17 or to change its curvature substantially as shown in the embodiments of the present invention may be constructed in accordance with the present invention; rather than having the front refractive surface curvature continuously change as disclosed.

Further, it is not essential to have symmetry of shape around the rotating axis. Namely, even if the refractive surfaces are different from each other according to the direction, if the feature of the refractive surfaces mentioned above is obtained, the same effects can be obtained. Furthermore, the specific feature of the front refractive surface of the present invention is used in the back refractive surface of the lens having a positive power, making it possible to provide a thin lens, i.e., to make the thickness of the center portion even thinner.

It will thus be seen that the objects set forth above, among those made apparent from the preceding description, are efficiently attained and, since certain changes may be made in the above article without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. An eyeglass lens comprising a front refractive surface and a back surface, at least one of said front and back surfaces being a refractive surface having an optical center wherein said at least one of said refractive surfaces is defined by a meridian, curvature of said meridian substantially increasing from the optical center as far as at least 15 mm towards the outer periphery of the lens in all directions;

said at least one refractive surface being further defined by a predetermined point contained thereon and said refractive surface having a rotational symmetry around said predetermined point;

said lens having an axis of symmetry, the curvature of said meridian increasing monotonically within at least 15 mm extending away from the axis of symmetry of said lens;

and the curvature value near said axis of symmetry in said at least one refractive surface is represented by $\rho_0 \, m^{-1}$, an equivalent spherical power of the lens is designated by S and a refractive index of a lens material is designated by n, and the following conditions are met:

$(n-1) \times \rho_0 \geq 0.5 \times (S+6) + 1.5$ when $-6 \geq S \geq -2$ and $(n-1) \times \rho_0 \geq 1.5$ when $S < -6$.

2. The eyeglass lens of claim 1, wherein the curvature of said meridian being constant for a distance greater than or equal to 3 mm, from the axis of symmetry in the direction of the lens outer periphery and then the change in curvature substantially increases.

3. The eyeglass lens of claim 2, wherein the change in curvature of said meridian is constant for a distance greater than or equal to 5 mm, from the axis of symmetry in the direction of the lens outer periphery and then the change in curvature substantially increases.

4. The eyeglass lens of claim wherein said lens is made of a material having a refractive index greater than or equal to 1.55, and the Abbe's number is less than or equal to 40.

5. The eyeglass lens of claim 2, wherein said lens is made of a material having a refractive index of greater than or equal to 1.55, and the Abbe's number is less than or equal to 40.

6. The eyeglass lens of claim 1, wherein said at least one refractive surface is the front surface.

7. An eyeglass lens comprising a front refractive surface and a back surface, at least one of said front and back surfaces being a refractive surface having an optical center wherein said at least one of said refractive surfaces is defined by a meridian, curvature of said meridian substantially increasing from the optical center as far as at least 15 mm towards the outer periphery of the lens in all directions;

said at least one refractive surface being further defined by a predetermined point contained thereon and said refractive surface having a rotational symmetry around said predetermined point;

said lens having an axis of symmetry, the curvature of said meridian increasing monotonically within at least 15 mm extending away from the axis of symmetry of said lens;

the curvature of said meridian being represented by $C(r)$ as a function of a distance r from the axis of rotation, and the linear differential coefficient $dc/dr$ of said function $C(r)$ increases at least once and then decreases in the distance away from said axis of symmetry;

and the curvature value near said axis of symmetry in said front refractive surface is represented by $\rho_0 \, m^{-1}$, an equivalent spherical power of the lens is designated by S and a refractive index of a lens material is designated by n, and the following conditions are met:

$(n-1) \times \rho_0 \geq 0.5 \times (S30 \, 6) + 1.5$ when $-6 \geq S \geq -2$ and $(n-1) \times \rho_0 \geq 1.5$ when $S < 6$.

8. The eyeglass lens of claim 7, wherein said lens is made of a material having a refractive index of greater than or equal to 1.55, and the Abbe's number is less than or equal to 40.

9. The eyeglass lens of claim 7, wherein said at least one refractive surface is the front surface.